United States Patent
Pallari

(10) Patent No.: US 9,296,129 B2
(45) Date of Patent: *Mar. 29, 2016

(54) ADDITIVE MANUFACTURING OF TILED OBJECTS

(71) Applicant: MATERIALISE N.V., Leuven (BE)

(72) Inventor: Jari Heikki Petteri Pallari, Rovaniemi (FI)

(73) Assignee: MATERIALISE N.V., Leuven (BE)

(*) Notice: Subject to any disclaimer, the term of this patent is extended or adjusted under 35 U.S.C. 154(b) by 71 days.

This patent is subject to a terminal disclaimer.

(21) Appl. No.: 14/245,953

(22) Filed: Apr. 4, 2014

(65) Prior Publication Data

US 2014/0217647 A1  Aug. 7, 2014

Related U.S. Application Data

(63) Continuation of application No. PCT/EP2012/069714, filed on Oct. 5, 2012.

(60) Provisional application No. 61/544,326, filed on Oct. 7, 2011.

(30) Foreign Application Priority Data

Oct. 7, 2011  (EP) .................... 11184363

(51) Int. Cl.
| | |
|---|---|
| *B29C 41/02* | (2006.01) |
| *B29C 33/38* | (2006.01) |
| *B29C 67/00* | (2006.01) |
| *B29C 33/44* | (2006.01) |
| *B29C 39/34* | (2006.01) |
| *B29C 39/26* | (2006.01) |

(52) U.S. Cl.
CPC ......... *B29C 33/3842* (2013.01); *B29C 33/3835* (2013.01); *B29C 33/448* (2013.01); *B29C 39/26* (2013.01); *B29C 39/34* (2013.01); *B29C 67/0055* (2013.01); *B29C 67/0077* (2013.01)

(58) Field of Classification Search
CPC ............ B29C 33/3835; B29C 33/3842; B29C 33/448; B29C 67/0051; B29C 67/0055; B29C 67/0059; B29C 67/0062; B29C 67/0066; B29C 67/007; B29C 67/0074; B29C 67/0077; B29C 67/0081; G06F 17/50; G06F 19/00
USPC ............ 264/219, 308, 317, 401, 497; 700/98, 700/118, 119, 120
See application file for complete search history.

(56) References Cited

U.S. PATENT DOCUMENTS

| | | |
|---|---|---|
| 2009/0176007 A1 | 7/2009 | Uckelmann |
| 2011/0309230 A1 | 12/2011 | Lauwers |

FOREIGN PATENT DOCUMENTS

| | | |
|---|---|---|
| DE | 102005050665 A1 | 4/2007 |
| FR | 2940166 A1 | 6/2010 |
| GB | 2358368 A | 7/2001 |
| WO | 2011044903 A2 | 4/2011 |

OTHER PUBLICATIONS

International Search Report issued for related application PCT/EP2012/069714 on Nov. 21, 2012.

*Primary Examiner* — Leo B Tentoni

(57) ABSTRACT

Objects and methods for the manufacture of objects are provided such that the manufactured objects comprise a plurality of tile pieces and seams between the tile pieces, the seams allowing for controlled breaking of the objects. In some embodiments, the objects comprise casting molds or mold parts comprising a tile structure.

13 Claims, 5 Drawing Sheets

ADDITIVE MANUFACTURING OF TILED OBJECTS

CROSS REFERENCE TO RELATED APPLICATIONS

This application is a continuation under 35 U.S.C. §120 of International Application No. PCT/EP2012/069714, filed Oct. 5, 2012 (and published by the International Bureau as International Publication No. WO 2013/050524 on Apr. 11, 2013), which claims the benefit of U.S. Provisional Patent Application No. 61/544,326, filed Oct. 7, 2011, and which also claims priority to European Application No. 11184363.7, filed Oct. 7, 2011. Each of the above referenced patent applications is hereby incorporated by reference in its entirety.

FIELD OF THE INVENTION

The application provides objects, such as casting molds, comprising features configured for controlled breaking of the objects, as well as methods for the use of such objects and methods for the manufacture of such objects.

BACKGROUND

Casting is a manufacturing process by which a liquid material is typically poured into a mold, which contains a hollow cavity of the desired shape, and then allowed to solidify. The solidified part is also known as a casting, and is ejected or broken out of the mold to complete the process. Casting is often used for making complex shapes that would be otherwise difficult or uneconomical to make by other methods. The mold itself may be manufactured by precision milling tools, although more recently, additive manufacturing has been used as well.

A problem which may arise during the casting of complex shapes is removal of the mold from the casting, particularly when the mold comprises a mold insert. Specific design rules are known in the art to overcome these problems. For example, studies have been undertaken to optimize the insert design in order to facilitate ejecting the molded part (e.g. Harris et al., J. Eng. Manufact. 2002, 216, 499-505). However, these rules entail certain limitations to the mold and/or shape of the object to be cast.

Accordingly, there is a need for improved objects, such as molds and/or mold inserts which mitigate at least one of the problems stated above.

SUMMARY OF THE INVENTION

The application provides objects such as, but not limited to, molds and mold inserts, comprising features for controlled breaking of the objects, as well as methods of using the objects and for the manufacture of the objects.

It has been found that specific advantages can be obtained by producing objects, such as mold parts, comprising several pieces (e.g. four or more), which are joined via a weakened seam, such that the object can be broken into several fragments in a controlled way.

As will be detailed herein, methods are provided for manufacturing an object or a part thereof such as, but not limited to, a casting mold or mold part, wherein the object comprises a plurality of pieces or tiles, which are connected through seams, which seams can be broken when the object is subjected to a pressure, such as a manual pressure.

More particularly, a method may comprise the step of meshing the object or a part thereof (or an image or model thereof) so as to determine the location of the seams forming the pieces making up the object or object part. In particular embodiments, a method for manufacturing an object or a part thereof (such as a casting mold or mold part) may comprise the steps of: (a) providing a 3D model of the object or part thereof such as a mold or mold part; (b) meshing the 3D model, thereby providing a 3D model of a meshed object or part thereof such as a meshed mold or mold part comprising several tile pieces and spacings between the tile pieces; and (c) manufacturing the tile pieces according to the model obtained in step (b) by additive manufacturing, thereby providing an object or part thereof such as a mold or mold part comprising solid tile pieces interlinked through seams; whereby the nature or size of the seams is such that their strength is reduced compared to the strength of the tile pieces. In some embodiments, the step of meshing involves dividing the object in four or more tile pieces.

In another embodiments, a method comprises the steps of: (a) providing a 3D model of the object or part thereof; (b) meshing the 3D model, thereby providing a 3D model of a meshed object or part thereof comprising several tile pieces and spacings between the tile pieces without changing the relative position of the tile pieces or the outline of the object or part thereof; and (c) manufacturing the tile pieces, based on the model obtained in step (b) by additive manufacturing, in a position relative to each other corresponding to the position in the object design or part thereof, thereby providing an object or part thereof such as a mold or mold part comprising solid tile pieces interlinked through seams; whereby the size of the spacings is chosen such that the tile pieces are joined together at the seams during manufacturing of the pieces with a strength which is reduced compared to the strength of the tile pieces. In some embodiments, the step of meshing involves generating a meshed object or part thereof which comprises four or more tile pieces.

In some embodiments, step (c) comprises manufacturing the tile pieces by Selective Laser Sintering (SLS). More particularly, step (c) may comprise applying a lower laser power to the positions corresponding to the spacings or seams than to the positions corresponding to the tile pieces.

Also provided herein are methods for generating a breaking pattern on an object for additive manufacturing, the method comprising meshing a 3D model of the object, such that the object comprises three or more tile pieces interlinked through spacings and/or seams, whereby the width of the seams and/or their method of manufacture is such that their strength is reduced compared to the strength of the tile pieces. According to particular embodiments, the methods provide that the width of the spacings or seams is between 0.01 and 1 mm.

In some embodiments, the size of the tile pieces is between 2 mm$^2$ and 4 cm$^2$. In some embodiments, the tile pieces are geometric shapes such as triangles, squares, hexagons, and pentagons. And in some embodiments, the geometry of the pattern is different for each axis of extrusion.

Thus, the methods described herein may be used to manufacture a casting mold or a mold part. For example, the application provides objects, such as molds or mold parts, which are obtainable by the methods described herein. In some embodiments, the mold parts are mold inserts. The application further provides objects that comprise a tiled structure, wherein the seams and tiles are made of the same material, but the seam strength is lower than the tile strength. Such objects may be made by additive manufacturing. In particular embodiments inserts for a casting mold are provided, wherein the inserts are made by additive manufacturing using the same material (or combinations of materials) as the mold, wherein the inserts are provided at least in part with a tiled structure and wherein the seam strength is lower than the tile strength.

The application also provides casting molds comprising a mold part. For example, in certain embodiments, casting molds are provided which are molds for a piece fitting on a human body part.

The application further provides methods for use of the objects provided herein. For example, a method of breaking an object may comprise the step of applying a force on all of the seams or one or more but not all of the seams between the tiles. In some embodiments, the method comprises breaking the object in a controlled way by applying pressure to a limited number (i.e. not all) of the tiles or seams simultaneously. In other embodiments, the method comprises, after having made a casting, breaking the casting mold by applying a force on the seams between the tiles of the casting mold.

The methods provided herein offer an improved flexibility in the design of objects, such as molds and mold inserts. These objects can be designed freely and may only be restricted by the limitations of the additive manufacturing technique, such as resolution, minimum wall thickness, etc. The objects such as molds and mold parts can be broken into small pieces in a controlled and predefined manner, which facilitates removal of the object from the casting. Furthermore, the weakened seams of the objects can be made such that they do not compromise the rigidity of the object and do not leave marks on the casting.

BRIEF DESCRIPTION OF THE DRAWINGS

The following description of the figures of specific embodiments is merely exemplary in nature and is not intended to limit the present teachings, their application or uses. Throughout the drawings, corresponding reference numerals indicate like or corresponding parts and features.

Figure 1:
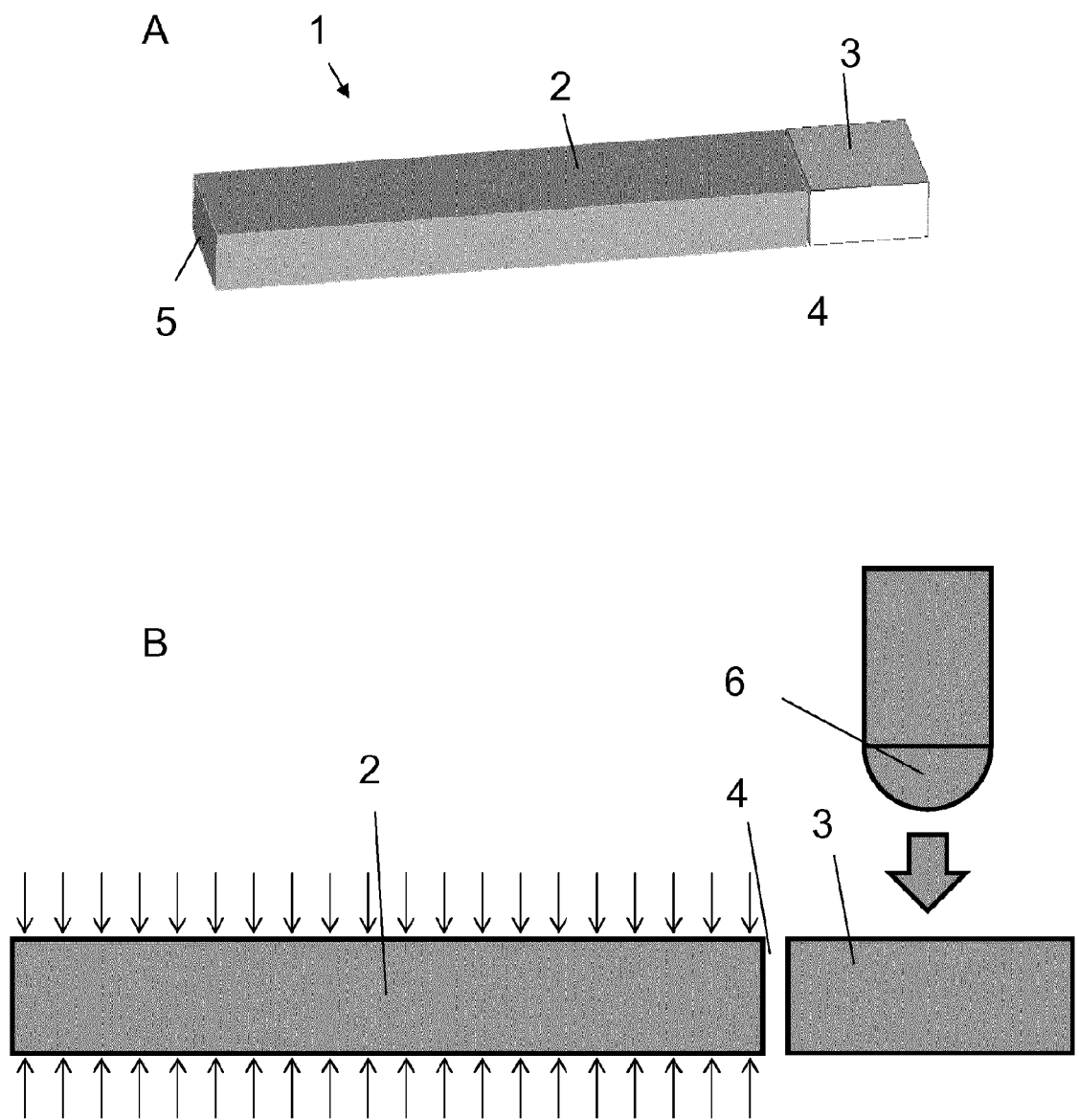
FIG. 1A: Schematic drawing of a test part (1) for measuring the strength of the seam (4) between two tile pieces (2, 3). B: Schematic drawing of a measurement setup for measuring the strength of the seam (4) between two tile pieces (2, 3).

In the aforementioned figures, the following numbering is used: 1—mold; 2, 3—tile piece; 4—seam; 5—surface; 6—probe; 7—mold insert; 8—outer mold; 9—composed mold; 10—plane.

DETAILED DESCRIPTION

The present application will refer to particular embodiments but the concepts disclosed herein are not limited thereto. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" the recited members, elements or method steps.

Furthermore, the terms "first", "second", "third" and the like in the description and in the claims, are used for distinguishing between similar elements and not necessarily for describing a sequential or chronological order, unless specified. It is to be understood that the terms so used are interchangeable under appropriate circumstances and that the embodiments described herein are capable of operation in other sequences than described or illustrated herein.

The term "about" as used herein when referring to a measurable value such as a parameter, an amount, a temporal duration, and the like, is meant to encompass variations of +/−10% or less, preferably +1-5% or less, more preferably +/−1% or less, and still more preferably +/−0.1% or less of and from the specified value, insofar such variations are appropriate to perform as envisioned. It is to be understood that the value to which the modifier "about" refers is itself also specifically, and preferably, disclosed. The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in the present disclosure, including technical and scientific terms, have the meaning as commonly understood by one of ordinary skill in the art to which this disclosure belongs. By means of further guidance, definitions for the terms used in the description are included to better appreciate the teaching of the present application. The terms or definitions used herein are provided solely to aid in the understanding of the concepts described herein.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are also envisioned as would be understood by those in the art. For example, in the enclosed claims, any of the claimed embodiments can be used in any combination.

Provided herein are methods for manufacturing an object such as a casting mold, or at least a part thereof. For example, an object such as a mold may consist of two halves which together form the mold. Each of these halves can then be considered a mold part. In particular embodiments, the mold part as described herein is a mold insert. The present methods are useful for the generation of objects for which controlled breaking is advantageous. Controlled breaking can be of interest for several purposes, such as, but not limited to situations where there are spatial limitations for removal of the object, where the environment is susceptible to damage from debris, where a gradual breakdown of the object is of interest, or to reduce the pressure required for breaking down the object. For instance, when using molds, and more particularly mold inserts for the provision of hollow objects, breakdown of the mold in a controlled way can be of interest. Thus, the present methods are especially useful for the production of molds or mold parts which are expected to be difficult to remove from the casting, for example certain mold inserts.

Provided herein are methods for manufacturing an object or part thereof such as a casting mold or mold part, wherein the object is provided as a plurality of pieces or tiles, which are connected through seams, and wherein the seams can be broken when the part of the object comprising the seam is subjected to a manual pressure. More particularly, the methods as described herein comprise the step of meshing the object or part thereof, such as a mold or mold part (or an image or model thereof), so as to determine the location of the seams forming the pieces making up the object or part thereof. In particular embodiments, as detailed below, the methods comprise meshing the object to comprise four or more tile pieces.

In particular embodiments, the methods for manufacturing a meshed object comprise the steps of: (a) providing a three dimensional (3D) representation or model of the object or part thereof; (b) at least partially meshing the 3D model obtained in step (a), thereby providing a 3D model of a (partially) meshed object (part) comprising several (tile) pieces and spacings or gaps between the (tile) pieces; more particularly the meshed object comprises four or more, (tile) pieces and spacings or gaps between the (tile) pieces; and (c) manufacturing the mold by additive manufacturing, thereby providing an object (or part thereof) comprising solid (tile) pieces interlinked through seams.

The methods envisioned herein are characterized in that the nature or size of the seams is such that their strength is reduced compared to the strength of the tile pieces. In particular embodiments, the methods are used for manufacturing a casting mold (part), particularly a casting mold insert. This will be explained in more detail herein below.

In particular embodiments, the methods as provided herein involve the provision of a 3D model of the object, which is used to determine how the object (or part thereof) can be optimally divided into pieces. Thus, in these embodiments, the methods involve a step comprising providing a 3D model of an object (part), which can be considered an object (part) design. The model according to step (a) is preferably a digital 3D model of the object (part), for example obtained via the Mimics or 3-matic computer program as provided by Materialise N.V., Leuven, Belgium.

In particular embodiments, the shape of the object (or part thereof) is at least in part based on a digital 3D model of the object to be cast. The 3D model may be obtained by scanning a prototype of the object to be cast using a 3D scanner, e.g. a laser scanner. In other embodiments, such as where the object is a mold insert, the shape of the object can be based on a digital 3D model of an object other than the object to be cast. For example, when the object to be cast is a glove, the shape of the mold insert is typically based on a 3D model of a hand. Alternatively the object to be cast may be a partial prosthetic requiring an insert or an organ shaped shell that requires an insert due to the degree of complexity.

In particular embodiments, the object is a personalized object and the 3D model is obtained at least in part based on a 3D image of the anatomy of the person or a part thereof. Thus, optionally, the methods as envisioned herein may include a step of obtaining a 3D image or representation of a body part. For the object envisioned to match with a body part, a 3D model can be obtained directly from a 3D image, for example obtained via the Mimics™ or 3-Matic™ computer program as provided by Materialise N.V., Leuven, Belgium. Optionally, non-personalized features can be added to the model. Thus, in particular embodiments, a 3D model of the object is made at least in part based on a 3D image of a body part. In further particular embodiments small modifications can be made to the 3D image to make the model. For example, for therapeutic or cosmetic applications, changes can be made to the original 3D image, such that the adapted 3D image corresponds to the desired image of the body part.

Thus the methods envisioned herein may comprise the step of designing a 3D model of an object based on a 3D image of a person's anatomy or part thereof. In alternative embodiments, the 3D image can be used directly as a 3D model.

Once a 3D model of the object is obtained, the model is meshed at least partially, i.e. divided into several subdomains, which are herein referred to as "tile pieces" or "tiles". In some embodiments, the mold model is meshed into three, four or more subdomains. Such a modification of the design defines the nature of the pieces that will be generated when a pressure is applied to the object. As will be clear to the skilled person, the shape and size of the tiles will depend on the nature and size of the object and the difficulties envisioned when breaking the object. Typically, most or all of the tile pieces are provided as similar pieces. In some embodiments, the pieces are selected such that they have a similar size, while in others the tiles may have a similar size and shape.

In particular embodiments, the 3D model obtained in step (a) is meshed, thereby obtaining a meshed object comprising a multitude of tile pieces. In some embodiments, the meshed object comprises at least three tile pieces. This implies the presence of at least two independent seams interlinking the different tile pieces, such that, if desired, pressure can be applied selectively to only one and not another seam. In particular embodiments, the independent seams are in different orientations. Thus, the object does not need to be broken along a predefined seam (e.g. which is the case when a single weakened seam is provided), but can be broken by the user along a seam as chosen by the user. This allows a user-defined breaking of the object.

In some embodiments, the meshed object comprises at least 4, 5, 6, 8, 10, 12, 14, 16, 18, 20, 30, 40, 50 or more tile pieces. Providing a larger number of tile pieces can in some embodiments mean that the manufactured object is provided with a multitude of weakened seams making it easier to break the mold.

Figure 4:
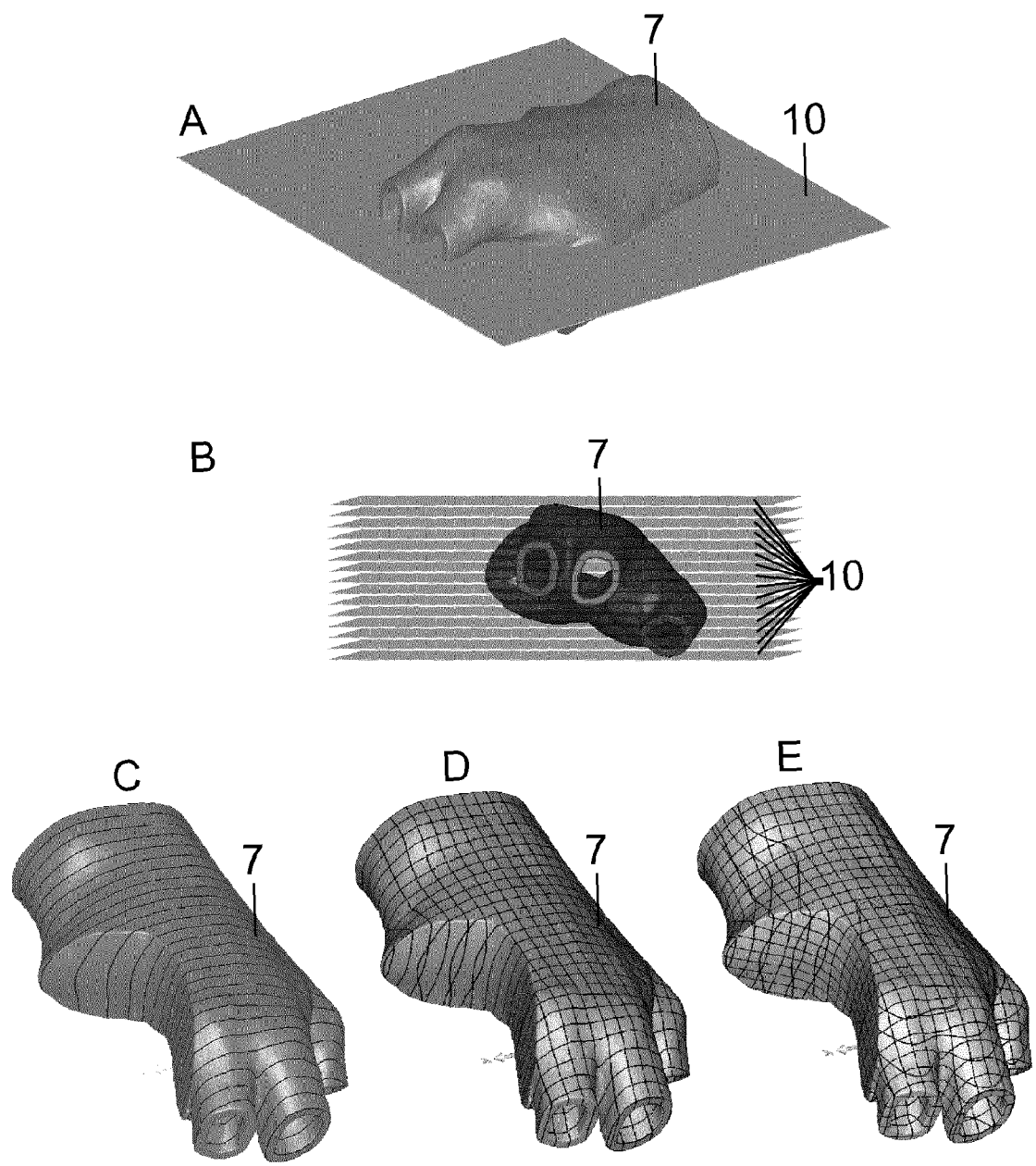
FIG. 4 Schematic images of the result of the meshing process according to particular embodiments of methods described herein. A: illustration of a model of a mold insert (7) and a first orientation (10) used for meshing the model of the mold insert (7). B: illustration of the parallel planes (10) according to which the model of the mold insert (7) is meshed based on the first orientation. C: illustration of a model of a mold insert (7) meshed in one orientation; D: illustration of a model of a mold insert (7) meshed in two perpendicular orientations; E: illustration of a model of a mold insert (7) meshed in three perpendicular orientations.

It is noted that the step of meshing the object model means that the model is at least in part divided into pieces which are connected by seams (or lines in the design). As will be detailed below, the meshed structure will be used in the manufacturing step such that, in particular embodiments, the connecting lines between the tiles or pieces represent spacings, i.e. areas in which no or less material is generated. In particular embodiments, the meshing is performed without changing the outline of the object. For example, where the seams are viewed as openings, the meshing could be considered to correspond to removing one or more thin slices from the model of the object (e.g. as illustrated in FIG. 4), such that the remaining tile pieces of the object are separated by spacings at the original location of the removed slices. And this meshing can be done in two or more orientations, such that individual tiles separated by seams are generated. Notably, the size and/or thickness of the tile pieces is typically considerably larger than the width of the spacings or seams.

In some embodiments, a method comprises meshing a model of the object, thereby providing a 3D model of a meshed object comprising three or more tile pieces and spacings or seams between the tile pieces, preferably without changing the relative position of the tile pieces and/or the outline of the object. The spacing or gap between the pieces ensures that the object will be provided with two or more weakened seams between the pieces.

In particular embodiments, step (b) as described above involves meshing the object model obtained in step (a), thereby providing a tiled structure comprising tile pieces separated from each other by spacings or seams.

The tile pieces may vary in shape or form according to the required specifications, more particularly for breaking of the object. The tile pieces may form a structured or unstructured mesh. A structured mesh is characterized by regular connectivity that can be expressed as a two or three dimensional array. An unstructured mesh is characterized by irregular connectivity. In preferred embodiments, the tile pieces form a structured mesh.

Figure 5:
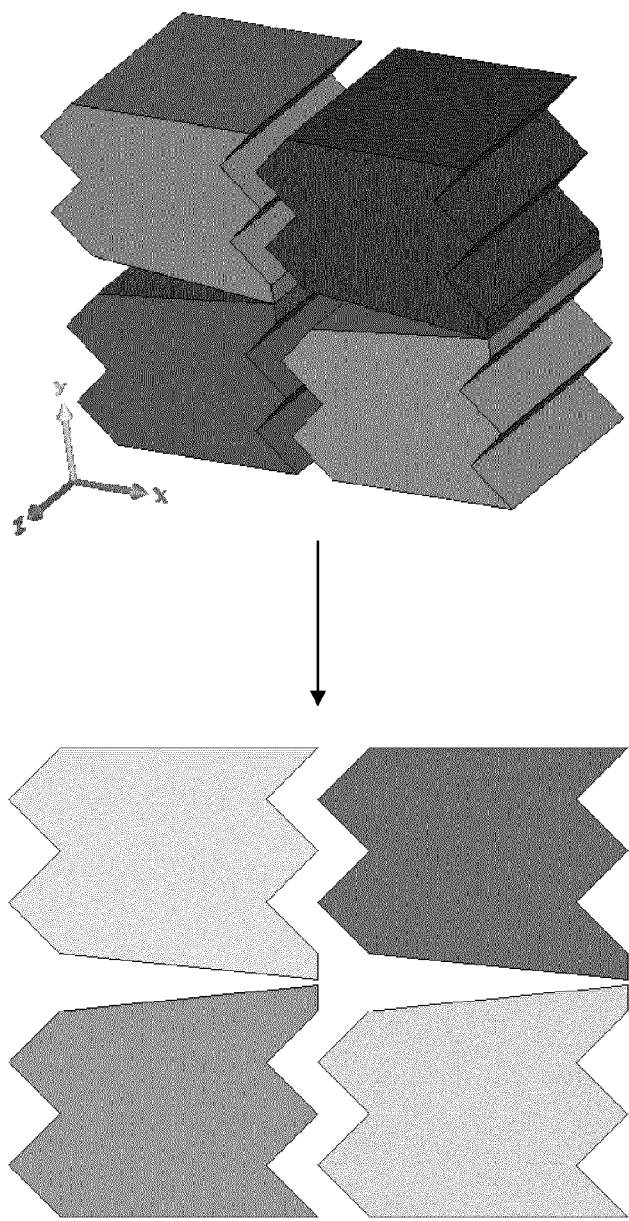
FIG. 5 Schematic drawing illustrating that the geometry of the tile pieces and hence also the contact surfaces between the tiles may vary depending on the axis of extrusion.

In certain embodiments, the tile pieces are essentially geometric pieces such as triangles, squares, rectangles, pentagons and/or hexagons. Thereby, the tile pieces ensure a tiled structure of the object. Also combinations of these shapes and/or other suitable geometries may be considered. In further embodiments, the tile pieces are triangular, square, rectangular, pentagonal and/or hexagonal prisms. Typically, the shape of the tile is determined by the desired requirements and impact of breaking the object (i.e. the amount of pressure to be applied and the resulting pieces to be generated). In specific embodiments, the geometry of the tile pieces is different for each axis of extrusion, as shown in FIG. 5.

It is envisioned that in particular embodiments, the tile pieces at one or more surfaces of the object have a different shape than the other tile pieces. More particularly, where the shape of the object is adjusted to correspond to a three-dimensional shape, such as a body part, the tiles provided at the surface of the object corresponding to this three dimensional shape will have one surface which is not geometrical. Indeed, typically for a mold insert, the interconnecting sides of the tiles will be have a geometrical or regular shape, while the surface of the tile which is intended to contact the cast is not. In particular embodiments, at least 20, 30, 40, 50, 60, 70, 80 or 90 percent of the tile pieces have a shape as described herein.

As detailed above, the number of tile pieces provided in the object model designed in the meshing step depends on various factors such as the size and shape of the object. In certain embodiments, the mold or mold part comprises three, five, ten, twenty, fifty, one hundred or more tile pieces. In particular embodiments, the meshing step ensures the provision of at least ten tile pieces in the mold, and in other embodiments, at least 20 pieces are provisioned. The size of the tile pieces provided in the object model will be determined by the nature of the object and the envisioned breaking pattern thereof.

In certain embodiments, the tile pieces have a typical surface dimension ranging between 2 mm$^2$ and 4 cm$^2$, preferably between 10 mm$^2$ and 2.5 cm$^2$, and more preferably between 25 mm$^2$ and 1 cm$^2$. In particular embodiments, the mold or mold part surface comprises between 0.25 and 10 tile pieces per cm$^2$, and preferably between 1 and 4 tile pieces per cm$^2$. However by using state of the art technologies such as laser micro sintering, the resolution of the manufactured objects can be reduced below the limits of commercial SLS devices, thereby providing resolution of less than 30 μm. Accordingly, in certain embodiments, the tile pieces may have a typical surface dimension below 2 mm$^2$ and may range from 250 μm$^2$ to 4 cm$^2$.

In some embodiments, as detailed above, the meshing step ensures the provision of at least ten pieces wherein all or most of the pieces have a similar size, more particularly sizes which differ at most by 5-10%. In certain embodiments, only part of the object may be meshed, and the meshed area will comprise at least ten pieces whereby all of the pieces have a similar size.

As detailed above, the meshing step provides tiles which are connected (or separated) by spacings or seams. In particular embodiments, the spacings or seams between adjacent tile pieces have planar geometry and have a uniform width. Consequently, in particular embodiments, the neighboring surfaces of two adjacent pieces or tiles have a planar geometry.

However, the spacings or seams and neighboring surfaces may also have other shapes and/or may have a non-uniform width. In particular embodiments, the adjoining surfaces of the tiles have a curved, jagged, serrated, corrugated or notched shape or geometry. In other embodiments, the seams or spacings have a uniform width. An important advantage of non-planar adjoining surfaces of the tiles is their enlarged area compared to when the adjoining surfaces are planar. This allows engineering of the seams to a certain intended breaking force. As described in more detail below, the seam surface strongly influences the seam strength. Additionally or alternatively, seams may be provided with different strengths in different directions. In particular embodiments, seams between some of the tiles with a non-uniform width may provide tailored strong and weak areas within the seams.

Thus, by determining the number, shape and size of the tiles in the object model and the width of the seams between them, the breaking of the object upon applying localized pressure is controlled.

Typically, the desired strength of the seams depends highly on the type of application the object is used for, and more particularly its envisioned breaking. Typically, for smaller objects, the seam strength is such that it is breakable by hand and typically ranges between 1 to 100 N, and preferably between 10 to 100 N.

The application thus also provides methods for providing a controlled breaking pattern on a 3D model. For example, a method comprises meshing the 3D model so as to divide the model into three or more solid tile pieces with seams between the tile pieces, wherein the breaking pattern contains information such that during manufacturing of the object, the strength of the seams is reduced compared to the strength of the tile pieces.

The design of the meshing in the methods envisioned herein is specifically adapted to the method of manufacturing the object. In some embodiments, the method of manufacturing is by additive manufacturing. In other embodiments, the object is manufactured by generating tile pieces interconnected by seams during manufacturing. Typically, an additive manufacturing apparatus builds objects on a layer-by-layer basis. The provision of the seams between the tile pieces can be ensured in different ways, and can be dependent on the additive manufacturing method used.

In particular embodiments, the seams are created by sintering only the tile pieces, while not sintering at the location of the seams. Provided the width of the seams is chosen correctly, the individual tile pieces will nevertheless be interlinked, but the strength of the object at the seams between the tile pieces is reduced compared to the strength of the tile pieces. The reason for this is that the thermal energy provided by a laser onto the powder material will also cause some sintering of the powder surrounding the individual tile pieces. The result is that neighboring tile pieces manufactured sufficiently close to each other will stick together. In alternative embodiments, the laser is also applied to the particles or powder at the locations corresponding to the spacings or seams between the tile pieces. In such embodiments, the laser power delivered to the particles or powder at the locations corresponding to the spacings is lower than the power delivered to the particles or powder at the locations corresponding to the tile pieces. This still results in areas with different degrees of sintering of the powder (i.e. the tile pieces and the seams) and thus different strengths, but method provides a better control of the seam strength.

In particular embodiments, the design of the meshing may also involve determining the optimal orientation of the meshing. Typically during additive manufacturing, the additive manufacturing apparatus proceeds in a direction perpendicular to the individual layers.

It has been found that, in particular embodiments, the reproducibility of the seam properties increases when the seam direction is parallel to the direction in which the additive manufacturing apparatus proceeds; this is the direction perpendicular to the layers of which the object is built. Therefore, in particular embodiments, the spacings or seams between the tile pieces are designed such that they are parallel to the direction in which the additive manufacturing apparatus proceeds. Thus, in some embodiments, the orientation of the object being manufactured is adjusted to ensure that the seams are generated in a direction which is parallel to the direction in which the additive manufacturing apparatus proceeds. Additionally, an alteration of the build direction can be used to change the strength of the bond between the tiles. As a result of this and in order to maintain the same structural strength throughout the object, the spacing can also be adjusted between different orientations. For example, an object can be provided having 0.1 mm thick seams for perpendicular tiles and 0.2 mm thick seams for parallel tiles.

Thus in particular embodiments, the design of the meshing involves selecting the width size of the seams based on the orientation of the seam within the object. As a result, in particular embodiments, the width of the spacings between the tile pieces in the meshed model depends on the orientation of the spacings. This allows to increase or decrease the strength of the object in particular directions. Additionally or alternatively, this may be used to compensate for the effects of the directionality of the additive manufacturing process as described herein above.

In particular embodiments, the methods described herein may further involve the step of manufacturing the object, more particularly the tile pieces provided in the meshing step via additive manufacturing. Additive Manufacturing can be defined as a group of techniques used to fabricate a tangible model of an object typically using three-dimensional (3-D) computer aided design (CAD) data of the object. Currently, a multitude of additive manufacturing techniques are available, including Selective Laser Sintering (SLS), stereolithography (SLA), Fused Deposition Modeling (FDM), foil-based techniques, etc.

Selective laser sintering (SLS) uses a high power laser or another focused heat source to sinter or weld small particles of plastic, metal, or ceramic powders into a mass representing a three-dimensional object to be formed. Fused deposition modeling (FDM) and related techniques make use of a temporary transition from a solid material to a liquid state, usually due to heating. The material is driven through an extrusion nozzle in a controlled way and deposited in the required place as described, for example, in U.S. Pat. No. 5,141,680. Foil-based techniques fix coats to one another by means of gluing or photo polymerization or other techniques and cut the object from these coats or polymerize the object. Such a technique is described in U.S. Pat. No. 5,192,539.

Typically additive manufacturing techniques start from a digital representation of the 3-D object to be formed. Generally, the digital representation is sliced into a series of cross-sectional layers which can be overlaid to form the object as a whole. The additive manufacturing apparatus uses this data for building the object on a layer-by-layer basis. The cross-sectional data representing the layer data of the 3-D object may be generated using a computer system and computer aided design and manufacturing (CAD/CAM) software.

Thus, in some embodiments, the object is manufactured by additive manufacturing as three or more tile pieces with seams between the tile pieces, the seams having reduced strength compared to the tiles. In particular embodiments, the tile pieces are manufactured such that the tile pieces are set in a position relative to each other corresponding to their position in the model obtained in the meshing step, and preferably without changing the outline of the object.

In particular embodiments, the object is manufactured by SLS. Using SLS, the object can be manufactured by sintering only the tile pieces. Indeed, when the meshing is provided such that the tile pieces are provided sufficiently close to each other, the individual tile pieces can be produced by an SLS process which will nevertheless be interlinked by seams, wherein the seam strength is reduced compared to the strength of the tile pieces.

The application thus further provides computer programs which have the potential to bring about, when run on a computer, the methods for meshing a 3D model of an object and computer-readable media, which comprise information relating to the implementation of a meshed 3D model in an additive manufacturing process.

The objects obtained by the present methods comprise three or more tile pieces which are linked by at least two independent weakened seams. The weakened seams allow breaking of the object in a controlled and predefined way into several tile pieces that are predefined. For instance, where the object is a mold insert, controlled breaking of the insert facilitates removal of the insert from a casting. In particular embodiments, a further advantage may be that the weakened seams can be made such that they do not compromise the rigidity of the object. In such embodiments, the seams do not increase the risk of deformation.

In particular embodiments, the width of the spacings between the tile pieces is chosen such that the tile pieces are linked by the seams during manufacturing of the tile pieces, wherein the seam strength is reduced compared to the strength of the tile pieces. Indeed, together with the seam surface area, the width of the seams or spacings between the tile pieces is an important parameter which influences the seam strength, as described further below. If the spacings are too narrow, the seams will be too strong, which makes it difficult to break the object in a controlled manner. On the other hand, if the spacings are too wide, the seams between the tile pieces will be too weak, or the tile pieces won't be joined together at all.

The optimal dimensions of the spacings between the individual tile pieces in the object design depend on various parameters such as the required seam strength, the material of which the object is made, the additive manufacturing technique and the resolution of the additive manufacturing device (e.g. 3D printer). In particular embodiments, the thickness of the seams between the tile pieces ranges between 0.01 and 1 mm, preferably between 0.02 and 0.5 mm, and more preferably between 0.05 mm and 0.5 mm. Accordingly, in particular embodiments, the model of the object is designed such that the spacings between the individual tile pieces have a width between 0.01 and 1 mm. However by using state of the art technologies, such as laser micro sintering, the resolution of the manufactured objects can be reduced below the limits of commercial SLS devices. For example, resolutions of less than 30 µm are possible. Accordingly, in certain embodiments, the thickness of the seams between the tile pieces ranges between 1 µm and 1 mm.

As described herein above, the present methods are especially useful for the production of molds or mold parts that are expected to be difficult to remove from the casting. In certain cases, the difficulties in mold removal arise only in small areas of the casting. In those cases, it is advantageous to design the mold in more than two parts (i.e. connected by independent seams), wherein at least one part corresponds to the area(s) of the object to be cast where difficulties in mold removal are expected, while the other parts correspond to the area(s) not expected to yield difficulties in mold removal. The mold part(s) corresponds to the area(s) of the object to be cast where difficulties are expected are then manufactured using the method as described herein, whereas the other mold part(s) could be made by any other method. An advantage of such a mold is that only a small part of the mold has to be broken after casting, whereas the rest of the mold can be reused. Preferably, the different mold parts are connectable to each other, for example via coupling features providing a snap-fit system, a pinned system, a dovetail system or the like. Accordingly, in particular embodiments, the mold part designed in step (a) comprises one or more coupling features.

Accordingly, in particular embodiments, a method for manufacturing a mold or a mold part, comprises: (a') providing a three-dimensional (3D) representation or model of the mold or mold part; (b') identifying one or more areas of the mold which are expected to be difficult to remove from the casting; (c') meshing the 3D model obtained in step (a) in the areas identified in step (b'), thereby providing a 3D model of a partially meshed mold comprising one or more mold parts, several tile pieces and spacings between the tile pieces; and d') manufacturing the tile pieces according to the design in step (c') by additive manufacturing, thereby providing a mold part comprising several solid tile pieces interlinked through seams; wherein the nature or size of the seams is such that their strength is reduced compared to the strength of the tile pieces and mold parts. In some embodiments, the mold model comprises three or more tile pieces connected by independent seams;

The application also provides objects or parts thereof, obtainable by the methods as described herein. In particular embodiments, the object or part thereof comprises at least 3, 4, 5, 6, 8, 10 or more tiles interlinked through seams, wherein the nature or size of the seams is such that their strength is reduced compared to the strength of the tile pieces. In particular embodiments, the tiles of the object have essentially the same size. More particularly, the object comprises at least 10 tiles having essentially the same size. Further particular embodiments provide that the object is a mold or mold part, preferably a mold insert. In particular embodiments, the mold comprises at least 3, 4, 5, 6, 8, 10 or more tiles, most particularly tiles having essentially the same size. In some embodiments, the mold comprises at least 10 tiles having essentially the same size.

Also envisioned herein are objects or parts thereof such as a mold (part), which are made by additive manufacturing provided with a tiled structure, wherein the tiles and the seams between the tiles are made of the same material. Additionally, the seam strength is lower than the tile strength. In particular embodiments, the object is a mold part and more preferably the object is a mold insert.

The material used to manufacture the object such may depend on the additive manufacturing method used, the nature of the object and the envisioned breaking of the object. Where the object is a mold this may also be influenced by the specifications of the object to be cast. The object or part thereof can be made of any material which is compatible with additive manufacturing, including polymeric materials, metals, metal alloys, ceramic materials and glass. In preferred embodiments, the object or part thereof is made of polyamide, polystyrene, steel, titanium, or aluminum. The object or part thereof may also be made of a composite material, preferably glass-filled polyamide or alumide. Alumide is a blend of polyamide and aluminum powder. Typical materials for making molds include, but are not limited to for instance DSM Somos® series of materials 7100, 8100, 9100, 9420, 10100, 11100, 12110, 14120 and 15100 (from DSM Somos); ABSplus-P430, ABSi, ABS-ESDI, ABS-M30, ABS-M30i, PC-ABS, PC-ISO, PC, ULTEM 9085, PPSF and PPSU materials (from Stratasys); Accura Plastic, DuraForm, CastForm, Laserform and VisiJet line materials (from 3-Systems); Aluminum, CobaltChrome and Stainless Steel materials, MarangingSteel, Nickel Alloy, Titanium, the PA line of materials, PrimeCast and PrimePart materials and Alumide and CarbonMide (from EOS GmbH). In specific embodiments, the tiles and the seams between the tiles consist of a sintered (and/or cross-linked) powder, whereby the degree of sintering (and/or cross-linking) in the tiles is higher than in the seams.

In preferred embodiments, the object or part thereof is made by layer manufacturing processes that selectively melt material with a laser or a similar "point" source, such as the SLS, SLM or the DMLS processes. More preferably the object or part thereof is made by SLS. Preferred materials for such layer manufacturing processes such as SLS include Nylon-12 and composites of Nylon-12 and various additives.

In particular embodiments, the object or part thereof is provided with a tiled structure, wherein the tiles have a typical surface dimension ranging between 250 µm$^2$ and 4 cm$^2$, particularly between 2 mm$^2$ and 4 cm$^2$, more particularly between 10 mm$^2$ and 2.5 cm$^2$. In particular embodiments the size of the tiles is between 25 mm$^2$ and 1 cm$^2$. In particular embodiments, the object surface comprises between 0.25 and 10 tile pieces per cm$^2$, particularly between 1 and 4 tile pieces per cm$^2$. The thickness or width of the seams between the tile pieces ranges between 1 µm and 1 mm, particularly between 0.01 and 1 mm. In particular embodiments it ranges between 0.02 and 0.5 mm, particularly between 0.05 mm and 0.5 mm.

Furthermore, according to particular embodiments, the tile pieces have a geometrical shape. Also, within the same object or part thereof at least 50% of the tile pieces have a similar geometrical shape. Typically, the tile pieces have a cubic or block shape wherein at least one of the surfaces of the tile pieces corresponds to or is complementary to a surface area of the 3D model. In particular embodiments, the object or part thereof is provided with 10 or more tile pieces. The objects may also further comprise 20, 30, 40, 50 or more tile pieces. Typically, at least 50% of the volume of the object or part thereof is made out of tile pieces. In this context, a tile piece is typically considered to be comparable in size as another tile piece (allowing for a 20% discrepancy). Thus, for instance, an object may comprise one larger unmeshed piece and further comprise one or more sections consisting of two or more, typically at least four or more tile pieces which are comparable in size.

Particular embodiments envisioned herein relate to casting molds which comprise at least one mold or mold part as described herein. In particular embodiments, at least one mold part is a mold insert.

In particular embodiments, the casting molds are molds for an object fitting on a human body part. In certain embodiments, the casting mold is a mold for casting a covering, such as a splint, a glove, a mask, a helmet, and the like.

In certain embodiments, the casting mold is a mold for casting a prosthesis. In further embodiments, the prosthesis is a prosthetic hand, foot or any other body part.

Further provided herein is the use of an object having the features as described herein. Such use typically involves the breaking of the object in a controlled way by applying pressure to the object.

In particular embodiments, these methods involve a step of applying pressure to one or a limited number of tiles and/or seams provided in the object so as to remove only one or a limited number of tiles. The method may involve subsequent steps wherein different areas of the object (i.e. different tiles or seams) are subjected to pressure.

In particular embodiments, these methods involve applying pressure to the entirety of the object so as to ensure breaking of all of the tiles. In further particular embodiments, the object is broken in a constrained physical space. In particular embodiments, the tile pieces are removed from a constrained physical space, e.g. through an opening which only allows passage of an individual tile.

In particular embodiments, the methods provide the use of a casting mold as described herein. The use comprises, after having made the casting, breaking the mold or mold part by applying a force on the seams between the tiles. In particular embodiments, the mold part is a mold insert of a hollow object and the use of the insert involves removal of the tile pieces from the cast object.

Hereinafter, a number of non-limiting embodiments are illustrated.

EXAMPLES

Example 1

Evaluation of Seam Strength

FIG. 1 shows a test part (1) as used for measuring the seam strength between two tile pieces. The test part (1) is a rectangular beam consisting of a long tile piece (2) and a short tile piece (3), which are joined via a seam (4). The seam surface has the same surface area as area (5). To measure the seam strength, the force needed to separate the two tile pieces (2, 3) is measured.

Figure 2:
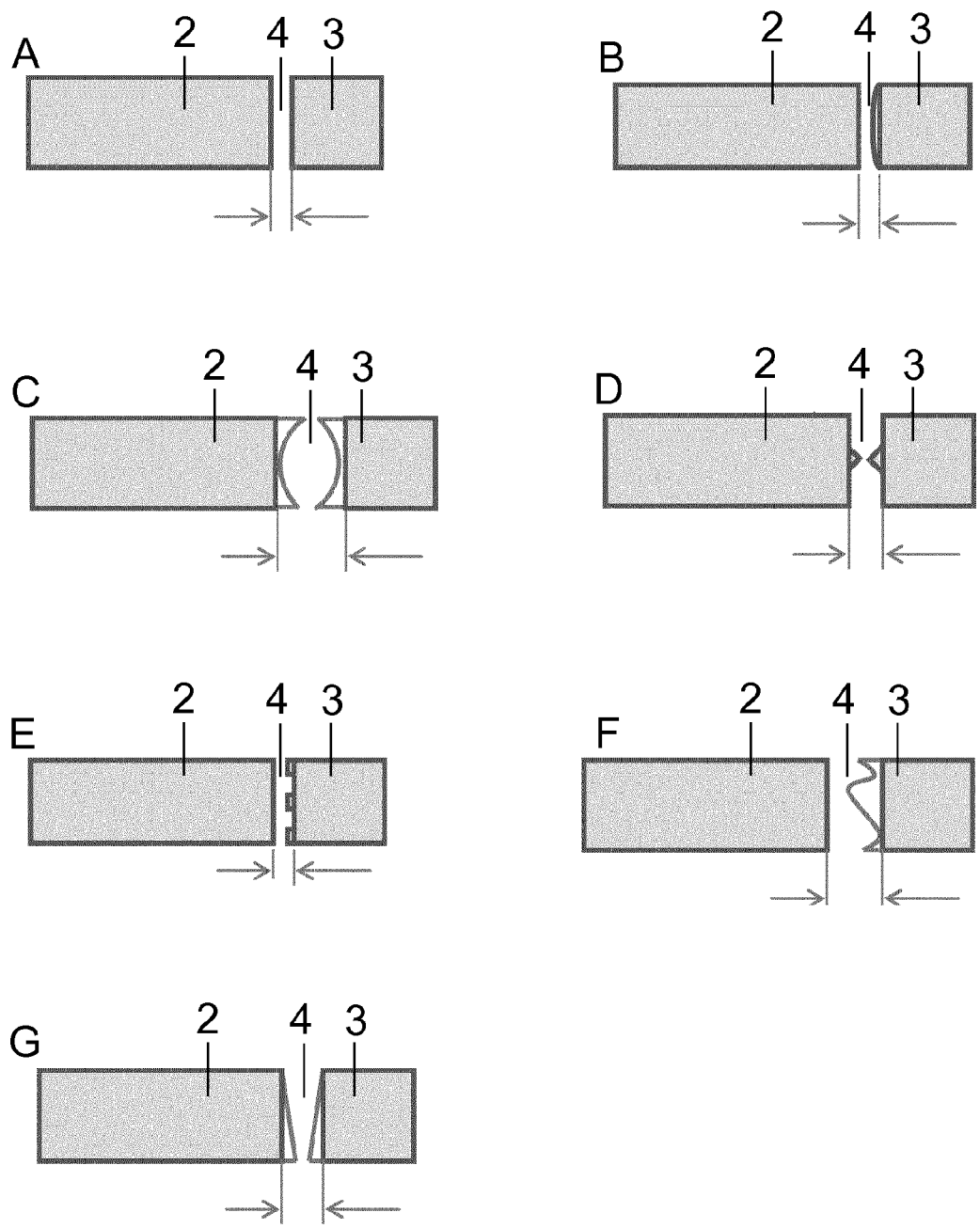
FIG. 2A: Schematic drawing of two pieces (2, 3) separated by a planar seam (4) with uniform thickness. B-G: Schematic drawing of two tile pieces (2, 3) separated by a seam (4) with non-uniform thickness.

This measurement set-up is presented in FIG. 2. The test part (1) comprising of the two tile pieces (2, 3) is clamped on a test rig via the long tile piece (2). A spherical steel probe (6) with a diameter of 5 mm was then placed in the middle of the short tile piece (3) and positioned to touch the surface of the tile piece (3). The probe (6) was then pressed down and the force required to translate it was measured.

From the measurement, the maximum force and the distance of the translation were recorded as shown in Table 1. These results show that the seam strength can be adapted over a wide range of values by changing the seam surface and/or width.

TABLE 1

Seam strength in function of seam surface area and width (distance).

| | | Force needed (N) | | | |
|---|---|---|---|---|---|
| Surface area (mm³) | 20 | 13.1 | 3.7 | 1.2 | — |
| | 30 | 26.7 | 13.1 | 26.4 | 6.7 |
| | 40 | 166.7 | 47.3 | 31.8 | 15.6 |
| | 50 | 330.0 | 338.0 | 107.8 | 49.3 |
| | | 5 | 10 | 15 | 20 |
| | | Distance (mm) | | | |

Additionally or alternatively, when manufacturing the mold or mold part by SLS, the seam strength can be adapted by also applying the laser to the powder in the gaps between the tile pieces, whereby the power delivered to the powder in the gaps is lower than the power delivered to the powder for producing the tile pieces, as described here above.

Example 1

Seams with Non-uniform Thickness

FIG. 2A shows an example of two tile pieces (2, 3) separated by a planar seam (4) with uniform thickness. Various examples of tile pieces (2, 3) separated by seam (4) with non-uniform thickness are shown in FIG. 2B-G. The seam with non-uniform thickness may be obtained if one or both neighboring surfaces of two adjacent tile pieces or tiles has a non-planar shape, for example as shown in FIG. 2 B, C, D, E and F. However, a seam with non-uniform thickness may also be obtained when both neighboring surfaces have a planar shape, as shown in FIG. 2 G. The non-uniform thickness of the seams may provide tailored strong and weak areas within the seams.

Example 2

Figure 3:
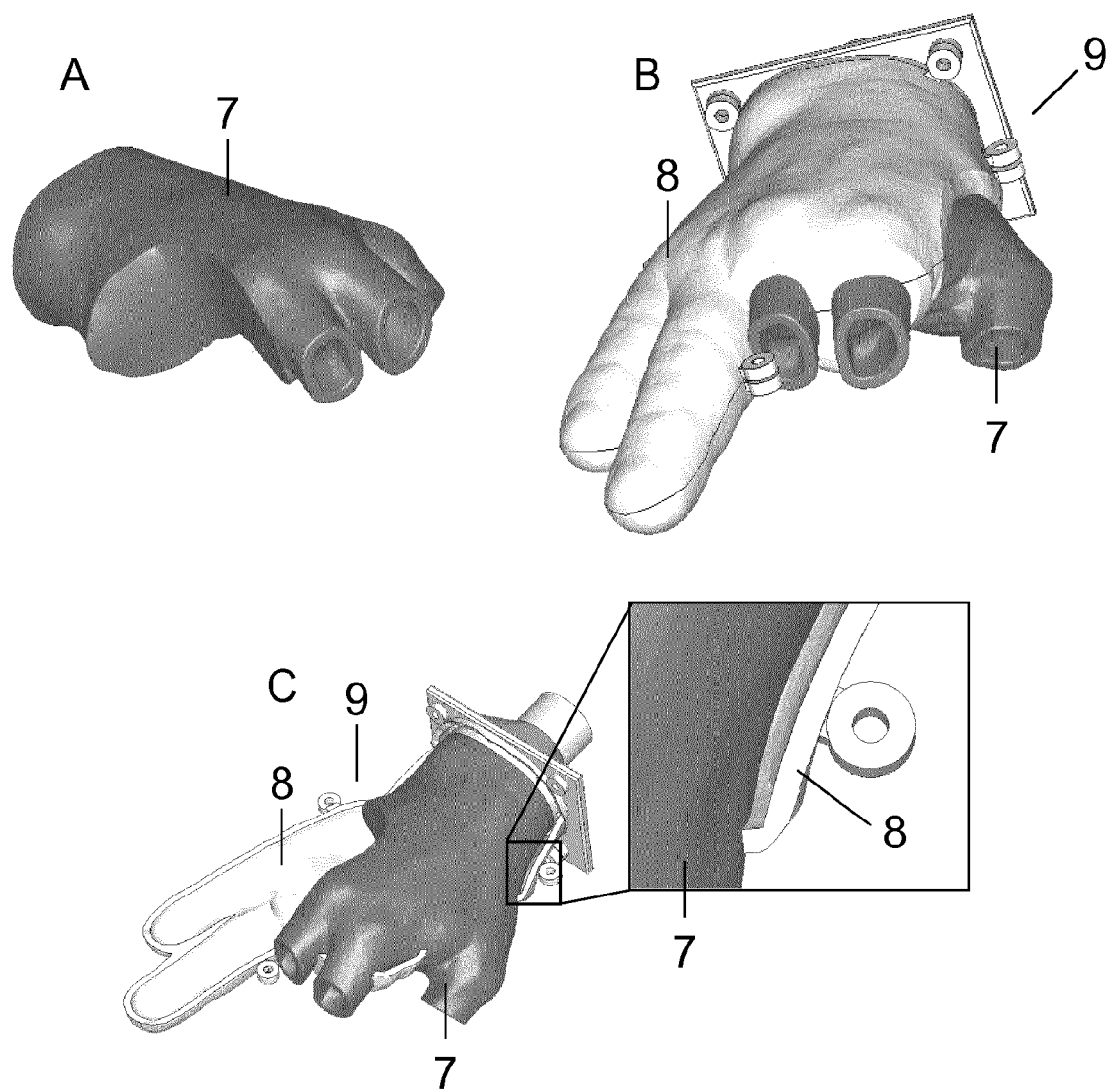
FIG. 3 A: Drawing of a mold insert (7). B: Drawing of a composed mold (9) comprising an insert (7) and outer mold (8). C: Section view of a composed mold (9) comprising an insert (7) and outer mold (8).

FIGS. 3 and 4 show an exemplary embodiment of a mold insert (7) which is placed within an outer mold (8). The composed mold (9) provides a mold which is suitable for casting a prosthetic or a part thereof. While the outer mold (8) can be removed easily after casting, the mold insert (7) is more difficult to remove. Accordingly the mold insert (7) is made by additive manufacturing using the methods as provided herein. More particularly, the mold insert is made of one and the same material and is provided with a tiled structure whereby the seam strength is lower than the tile strength. This allows breaking of the mold insert by applying manual pressure thereon and removal of the tiles from the interior of the prosthetic part.

What is claimed is:

1. A method for manufacturing an object, the method comprising:
   providing a 3D model of the object;
   determining a 3D mesh model of the object based on the 3D model of the object, the mesh model comprising a plurality of tile pieces and one or more seams between the tile pieces; and manufacturing the object by additive manufacturing based on the 3D mesh model such that the manufactured object comprises a plurality of tile pieces interlinked by one or more seams;
wherein the strength of the one or more seams is less than the strength of any tile piece.

2. The method of claim 1, wherein the object is manufactured by Selective Laser Sintering (SLS).

3. The method of claim 2, wherein the strength of each of the plurality of seams is obtained by applying a lower laser power level to the seams during manufacturing relative to a higher laser power level applied to the tile pieces.

4. The method of claim 1, wherein the width of the one or more seams is between 0.01 and 1 mm.

5. The method of claim 1, wherein the size each tile piece is between 2 mm$^2$ and 4 cm$^2$.

6. The method of claim 1, wherein each tile piece is one of a triangle, a square, a hexagon, or a pentagon.

7. The method of claim 6, wherein the geometry of each tile piece is different for each axis of extrusion.

8. The method of claim 1, wherein the object is a casting mold or mold part.

9. A method for generating a breaking pattern on an object for additive manufacturing, the method comprising:
meshing a 3D model of the object by dividing the 3D model into a plurality of tiles interlinked by one or more seams, wherein the width of each seam is configured such that its strength is reduced compared to the strength of the plurality of tile pieces.

10. The method of claim 9, wherein the object is a mold or a mold part.

11. The method of claim 9, wherein the object is an insert for a casting mold.

12. The method of claim 11, wherein the casting mold is configured to resemble a human body part.

13. The method of claim 9, further comprising:
manufacturing the object using an additive manufacturing technique,
wherein the object is configured to be broken by applying pressure to the one or more seams simultaneously.

* * * * *